(12) United States Patent
Liu et al.

(10) Patent No.: US 10,984,291 B2
(45) Date of Patent: Apr. 20, 2021

(54) END-MEMBER EXTRACTION METHOD BASED ON SEGMENTED VERTEX COMPONENT ANALYSIS (VCA)

(71) Applicant: SHANDONG UNIVERSITY, Shandong (CN)

(72) Inventors: Zhi Liu, Jinan (CN); Mingyu Nie, Jinan (CN); Qingchen Qiu, Jinan (CN); Yulin Sun, Jinan (CN)

(73) Assignee: SHANDONG UNIVERSITY, Shandong (CN)

( * ) Notice: Subject to any disclaimer, the term of this patent is extended or adjusted under 35 U.S.C. 154(b) by 240 days.

(21) Appl. No.: 16/099,140

(22) PCT Filed: Feb. 21, 2017

(86) PCT No.: PCT/CN2017/074294
§ 371 (c)(1),
(2) Date: May 8, 2019

(87) PCT Pub. No.: WO2017/190542
PCT Pub. Date: Nov. 9, 2017

(65) Prior Publication Data
US 2019/0392261 A1    Dec. 26, 2019

(30) Foreign Application Priority Data

May 4, 2016    (CN) .......................... 201610289893.5

(51) Int. Cl.
*G06K 9/00*    (2006.01)
*G06K 9/62*    (2006.01)
*G06F 17/16*    (2006.01)

(52) U.S. Cl.
CPC ........... *G06K 9/6263* (2013.01); *G06F 17/16* (2013.01); *G06K 9/6218* (2013.01);
(Continued)

(58) Field of Classification Search
None
See application file for complete search history.

(56) References Cited

U.S. PATENT DOCUMENTS 8,385,615 B2 * 2/2013 Levenson ............. G01J 3/4406
382/128
2009/0144350 A1    6/2009 Chang
(Continued)

FOREIGN PATENT DOCUMENTS

CN        102592134 A    7/2012
CN        104008574 A    8/2014
(Continued)

OTHER PUBLICATIONS

Wang et al., "An Automatic Endmember Extraction Algorithm from Hyperspectral Image," China Academic Journal Electronic Publishing House, Apr. 2010, pp. 8-12.
(Continued)

*Primary Examiner* — Hadi Akhavannik
(74) *Attorney, Agent, or Firm* — Oliff PLC

(57) ABSTRACT

An end-member extraction method based on segmented VCA, includes: conducting rough segmentation on a hyperspectral image by using an unsupervised classification method to partition image elements having a similar substance into the same block; conducting end-member extraction on an area in each partitioned block by using VCA, inverting the abundance by using a least square method after the end-member extraction, and determining one main end-member for each block according to the abundance value; and extracting the main end-members in all blocks and forming an end-member matrix of a global image. The VCA end-member extraction method is used in relatively simple partitioned environment blocks, and the main end-members in the blocks are then controlled by using the abundance inversion result feedback in the blocks, so as to prevent missing main end-members.

8 Claims, 3 Drawing Sheets

(52) U.S. Cl.
CPC ......... *G06K 9/6286* (2013.01); *G06K 9/0063* (2013.01); *G06K 2009/00644* (2013.01)

(56) References Cited

U.S. PATENT DOCUMENTS

| | | | | |
|---|---|---|---|---|
| 2011/0229001 | A1* | 9/2011 | Kopriva | H01J 49/0036 382/131 |
| 2015/0161768 | A1* | 6/2015 | Ardouin | G06K 9/0063 382/113 |
| 2018/0283849 | A1* | 10/2018 | Fricout | G01B 11/0625 |

FOREIGN PATENT DOCUMENTS

| | | |
|---|---|---|
| CN | 104751181 A | 7/2015 |
| CN | 105046648 A | 11/2015 |
| CN | 105976310 A | 9/2016 |

OTHER PUBLICATIONS

Zhao et al., "A Fuzzy ISODATA Approach Combing Hidden Markov Random Field Model for High Resolution Remote Sensing Image Segmentation," Journal of Signal Processing, Feb. 2016, vol. 32, No. 2, pp. 157-166.

May 3, 2017 International Search Report issued in International Patent Application No. PCT/CN2017/074294.

* cited by examiner

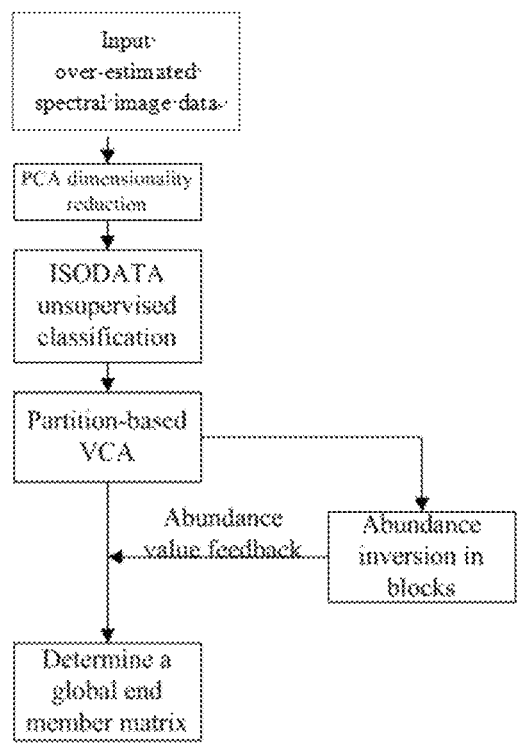
Fig. 1
 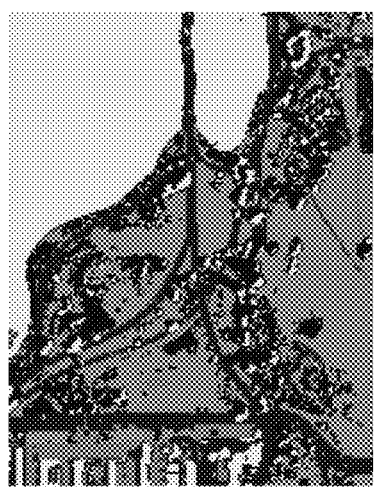
Fig. 2a        Fig. 2b
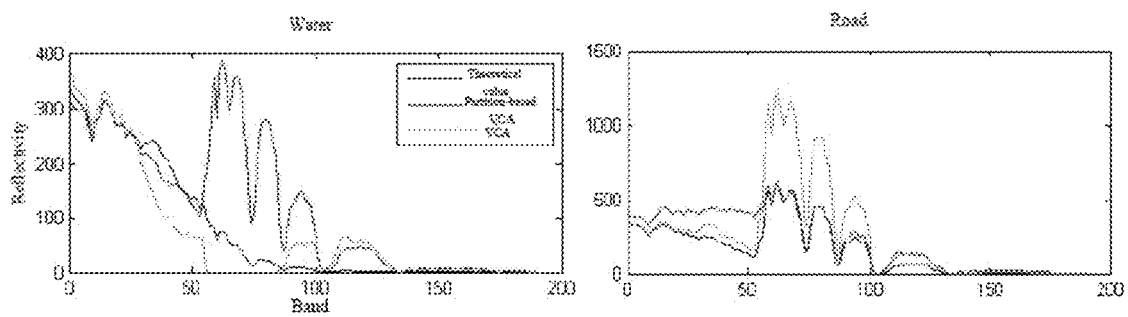
Fig. 3a        Fig. 3b

END-MEMBER EXTRACTION METHOD BASED ON SEGMENTED VERTEX COMPONENT ANALYSIS (VCA)

FIELD OF THE INVENTION

The present invention relates to the technical field of image processing, and specifically relates to an end-member extraction method based on segmented vertex component analysis (VCA).

BACKGROUND OF THE INVENTION

A hyperspectral image is a three-dimensional data image that reflects spectral information and spatial information of an object at the same time, and has the characteristics of wide band coverage, rapidness, losslessness, sufficient spectral information content, etc. A hyperspectral imaging system acquires hyperspectral images of an imaged object in a series of relatively continuous bands, using an image spectrometer and a sensor in ultraviolet, visible light, near infrared and infrared bands (wavelengths between 300 nm and 2500 nm). Due to the spatial resolution limitation of the sensor and the complexity and diversity of ground features in the nature, some pixels often contain more than one substance, and such pixels are called mixed pixels. In the presence of the mixed pixels, the conventional classification method is not suitable for accurate subdivision and identification of ground features. In order to improve the accuracy of remote sensing classification, the problem of mixed pixels must be solved, so unmixing of mixed pixels becomes a key step before the classification and identification of ground features.

Before the unmixing of mixed pixels, a linear mixed model (LMM) of hyperspectral images needs to be established first. In the LMM, the pixels in the hyperspectral images are linearly combined by a certain ratio (abundance) of spectral characteristics of basic substances (end-members) constituting the images at different wavelength bands. The unmixing of mixed pixels is an inverse process of the linear mixed model of hyperspectral images, and is a process of extracting end-members from an image by certain means and calculating the corresponding abundance of the end-members.

Vertex component analysis (VCA) is one of the most basic geometry-based hyperspectral image end-member extraction methods. According to the geometry-based end-member extraction method, based on the spatial distribution characteristics of hyperspectral datasets, it is believed that in the geometric space, end-members often exist in the vertexes of simplexes, polyhedrons or convex cones composed of hyperspectral image datasets. The VCA extracts the end-members one by one by repeatedly searching for orthogonal vectors in the data space and calculating the projection distances of the pixels on the orthogonal vectors.

Due to the complexity of actual ground features and the influence of noise and the like, the phenomena that main end-members are missing, the extracted end-members are inaccurate, the extraction is liable to be affected by noise, etc. often occur in the process of extracting end-members by using VCA.

SUMMARY OF THE INVENTION

In order to solve the problems of the prior art, the present invention discloses an end-member extraction method based on segmented VCA, in which a complex environment of a hyperspectral image is partitioned into a plurality of relatively simple images by using a certain classification method, and then VCA end-member extraction is performed on the simple images, thereby reducing the influence of noise of the global image on the algorithm, avoiding missing main end-members, and improving the accuracy of end-member extraction.

In order to achieve the above objective, the specific solution of the present invention is as follows:

An end-member extraction method based on segmented VCA, comprising:

conducting rough segmentation on a hyperspectral image by using an unsupervised classification method to partition image elements having a similar substance into the same block;

conducting end-member extraction on an area in each partitioned block by using VCA, inverting the abundance by using a least square method after the end-member extraction, and determining one main end-member for each block according to the abundance value; and extracting the main end-members in all blocks and forming an end-member matrix of a global image.

Further, PCA is required for dimensional reduction on hyperspectral image data before the rough segmentation on the hyperspectral image by using the unsupervised classification method.

Further, in the PCA dimensional reduction, the input high-dimensional image data $X=(x_1, x_2, \ldots, x_m)^T$ is vector-centered first, a covariance matrix of the vector-centered data is calculated, and an eigenvalue matrix $\Lambda$ and an eigenvector matrix A of the covariance matrix are calculated;

then the eigenvector matrix A is used for principal component transformation on the high-dimensional image data X into $Z=A^T X$; and finally, part of principal components in Z are selected as low-dimensional features of the original high-dimensional data to achieve data dimensional reduction.

Further, the hyperspectral image data after dimensional reduction is subjected to unsupervised classification using an iterative self-organizing data analysis method ISODATA, the number l of classes is equal to the number r of end-members in the known image, i.e., l=r, and the segmentation result is $\Gamma_i$, wherein i=1, 2, ..., r.

Further, the classes are automatically merged and split in the unsupervised classification process with the ISODATA. The merging mechanism indicates that when the total number of classes is too large or the center distance between two classes is smaller than a threshold, the two classes are merged into a new class, which will be canceled when the number of samples in the class is smaller than a threshold; the splitting mechanism indicates that when the total number of classes is too small or the number of samples in a class exceeds a threshold, and the standard deviation within the class is greater than a splitting threshold, the class is divided into two classes, thereby obtaining a clustering result with a relatively reasonable number of classes.

Further, for all block areas $\Gamma_i$, the number of end-members is set to r', wherein r'<r, and VCA end-member extraction is conducted respectively.

Further, the VCA end-member extraction algorithm process is to first find an initial unit vector, then project all pixels onto the vector, mark the pixel with the largest projection distance as an end-member point, add the same to an end-member matrix set, find a vector orthogonal to all the found end-members according to the new end-member set, and conduct next cycle to calculate the pixel projection distance and find new end-members until all end-members are found.

Further, for all block areas $\Gamma_i$, after the end-members in the blocks are extracted, the abundance is inverted for the block areas respectively by using the least square method. According to the abundance feedback in the block areas, the main end-member in each block area is determined, and the main end-members in all blocks are extracted to form an end-member matrix of the global image.

Further, in a linear model, the pixels X of the hyperspectral image are a linear combination of an end-member matrix E and an abundance matrix A, that is, satisfying a formula X=E×A, and the abundance matrix elements $a_{ij}$ satisfy the constraints of a sum $$\sum_{j=1}^{m} a_{ij} = 1,$$

$\forall$i and non-negative $a_{ij} \geq 0$, $\forall$i, $\forall$j;

According to whether the least square method considers the non-negative constraint and the constraint of the sum 1 in the solution process, the least square method can be regarded as an unconstrained least square method UCLS, a sum 1 constrained least square method SCLS, a non-negative constrained least square method NCLS, or a full constrained least square method FCLS.

Further, in the unconstrained least square method UCLS, the sum 1 of abundances and the non-negative constraint are not considered, and after r end-members $\{e_j\}$ are solved, j=1, 2 . . . , r, the linear mixed model is solved using the least square method, and the abundance estimate obtained of available pixels i is $a_{UCLS}(x_i)=(E^TE)^{-1}E^Tx_i$.

The present invention has the following beneficial effects:
1. Before the end-members are extracted using the VCA, the similar pixels in the hyperspectral image are aggregated first by unsupervised classification to exclude the influence of unrelated pixels and reduce the complexity of the end-member extraction environment.
2. The VCA end-member extraction method is used in relatively simple partitioned environment blocks, and the main end-members in the blocks are then controlled by using the abundance inversion result feedback in the blocks, so as to prevent missing main end-members.

BRIEF DESCRIPTION OF THE DRAWINGS

FIG. 1 is a flow diagram of the present invention;
FIG. 2a is a Washington D.C. mall image;
FIG. 2b is an image of the Washington D.C. mall image after ISODATA segmentation;
FIGS. 3a-3e are comparison diagrams (Washington D.C. mall data) of end-members extracted by segmented VCA, end-members extracted by original VCA and theoretical end-members.

DETAILED DESCRIPTION OF THE EMBODIMENTS

Figure 3C:
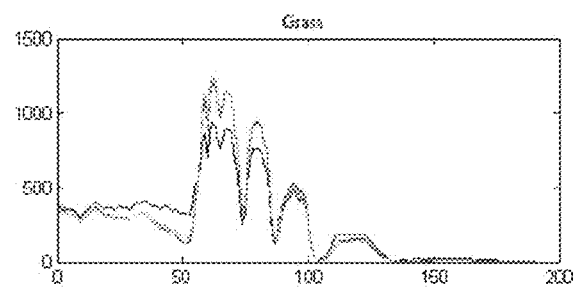
Figure 3D:
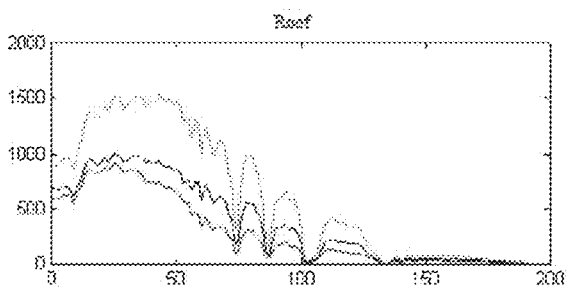
Figure 3E:
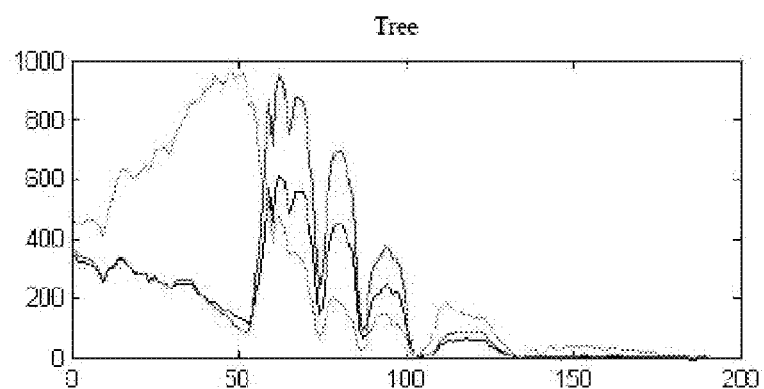

The present invention will be further described in detail below in combination with the accompanying drawings.

An end-member extraction method based on segmented VCA, comprising:
(1) inputting hyperspectral image data $X \in R^{m \times n}$, wherein m is the number of bands of a hyperspectral image, n is the total number of pixels of the hyperspectral image, and the number of end-members is r; conducting dimensional reduction on the hyperspectral image data by using PCA;
(2) conducting unsupervised classification on the hyperspectral image data after the dimensional reduction by using ISODATA, the number of classes being l, wherein l=r;
(3) segmenting the hyperspectral image into $\Gamma_i$ by using the classification result, wherein i=1, 2, . . . , r;
(4) for all block areas $\Gamma_i$, setting the number r' of end-members, wherein r'<r; conducing VCA end-member extraction respectively;
(5) for all block areas $\Gamma_i$ conducting abundance inversion on the block areas respectively by using a least square method; and
(6) according to the abundance feedback in the block areas, determining a main end-member in each block area, and extracting the main end-members in all blocks to form an end-member matrix of the global image.

The PCA Dimensional Reduction in Step (1):

Prior to ISODATA unsupervised classification, signals need to be dimensionally reduced. The present invention uses principal component analysis (PCA) to reduce dimensionality. PCA is a linear transformation in which principal components are uncorrelated and are arranged in a descending order according to the amount of information included. After the high-dimensional data undergoes PCA transformation, the first few principal components cover the main information of the original data, so the original high-dimensional data can be characterized by low-dimensional features, thereby realizing dimensional reduction of the data. In the PCA dimensional reduction, the input high-dimensional image data $X=(x_1, x_2, \ldots, x_m)^T$ is vector-centered first, a covariance matrix of the vector-centered data is calculated, and an eigenvalue matrix $\Lambda$ and an eigenvector matrix A of the covariance matrix are calculated. Principal component transformation $Z=A^TY$ is then conduced using a principal component transformation matrix A. Finally, part of the principal components in Z are selected as low-dimensional features of the original high-dimensional data to achieve data dimensional reduction.

The ISODATA Unsupervised Classification in Step (2):

The iterative self-organizing data analysis method (ISODATA) algorithm is an unsupervised classification method that extracts features for clustering directly from samples without prior knowledge. The ISODATA algorithm improves K-means clustering. After all the samples are adjusted, the mean of the samples is recalculated, and the classes are automatically merged and split, so the ISODATA algorithm has certain self-organization. The merging mechanism in the ISODATA algorithm indicates that when the total number of classes is too large or the center distance between two classes is smaller than a threshold, the two classes are merged into a new class, which is canceled when the number of samples in the class is smaller than a threshold. The splitting mechanism indicates that when the total number of classes is too small or the number of samples in a class exceeds a threshold, and the standard deviation within the class is greater than a splitting threshold, the class is divided into two classes, thereby obtaining a clustering result with a relatively reasonable number of classes.

The VCA End-Member Extraction in Step (4):

The VCA end-member extraction algorithm is based on a linear spectral model. The end-members are extracted one by one by repeatedly searching for orthogonal vectors in the data space and calculating the projection distances of the pixels on the orthogonal vectors. The basic theory of VCA is that a plurality of vertexes of a simplex can be expanded into a subspace, wherein the vertexes of the simplex are maximum points of projection lengths on a vector orthogonal to the subspace.

In the VCA end-member extraction algorithm, an initial unit vector is found first, then all pixels are projected onto the vector, the pixel with the largest projection distance is marked as an end-member point, and the end-member point is added to an end-member matrix set. A vector orthogonal to all the found end-members is then found according to the new end-member set, and the next cycle is conducted to calculate the pixel projection distance and find new end-members until all end-members are found.

The Least Square Method in Step (5):

In a linear model, the pixels X of the hyperspectral image are a linear combination of an end-member matrix E and an abundance matrix A, that is, satisfying a formula X=E×A. The abundance matrix satisfies the constraints of a sum $$\sum_{j=1}^{m} a_{ij} = 1,$$

$\forall$i and non-negative $a_{ij} \geq 0$, $\forall$i, $\forall$j. After the end-member matrix is solved, the problem of solving the abundances of mixed pixels becomes a simple linear problem, so it can be solved using the least square method. According to whether the non-negative constraint and the constraint of the sum 1 are considered in the solution process, the least square method can be regarded as an unconstrained least square method (UCLS), a sum 1 constrained least square method (SCLS), a non-negative constrained least square method (NCLS), or a full constrained least square method (FCLS). In the UCLS, the sum 1 of abundances and the non-negative constraint are not considered, and after r end-members $\{e_j\}(j=1, 2, \ldots, r)$ are solved, the linear mixed model is solved using the least square method, and the abundance estimate obtained of available pixels i is $a_{UCLS}(x)=(E^TE)^{-1}E^Tx_i$.

EMBODIMENT

In the embodiment, Washington D.C. mall data having relatively simple spatial distribution of ground features and HYDICE Urban data having relatively complex spatial distribution are respectively used for test. In the test process, the end-member extraction method based on segmented VCA is compared with the original VCA end-member extraction method, and artificially extracted pure end-members are used as theoretical end-members.

Experimental data Washington D.C. mall is hyperspectral data photographed in Washington D.C. USA. The data totally has 210 bands, and 191 bands are left after some bands affected by noise are removed. The size of the whole image is 1280×307. A part (200×150) of the image having relatively simple spatial distribution of ground features in the data is selected in this experiment. A pseudo color image of the part of the image is shown in FIG. 2a. The part of image contains five substances: water, road, grass, roof and tree.

Figure 4A:
FIG. 4a is a HYDICE Urban image.
Figure 4B:
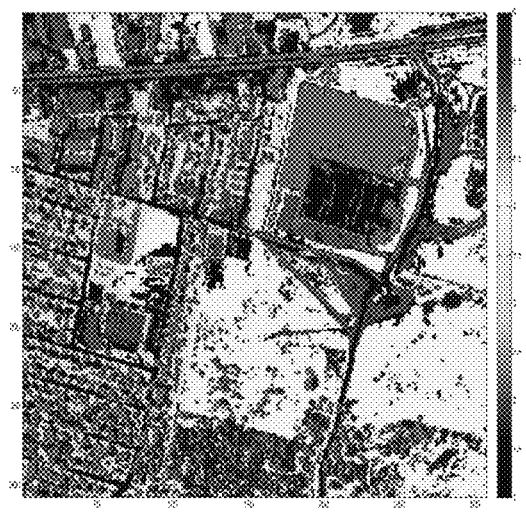
FIG. 4b is an image of the HYDICE Urban image after ISODATA segmentation.
Figure 5A:
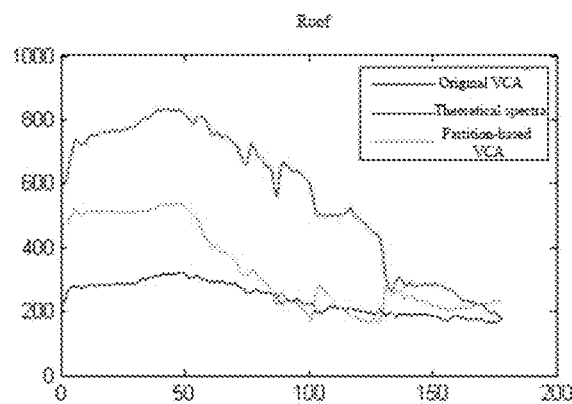
FIGS. 5a-5f are comparison diagrams (HYDICE Urban data) of end-members extracted by segmented VCA, end-members extracted by original VCA and theoretical end-members.
Figure 5B:
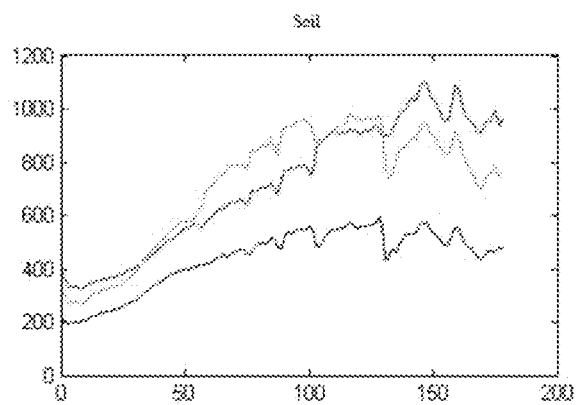
Figure 5C:
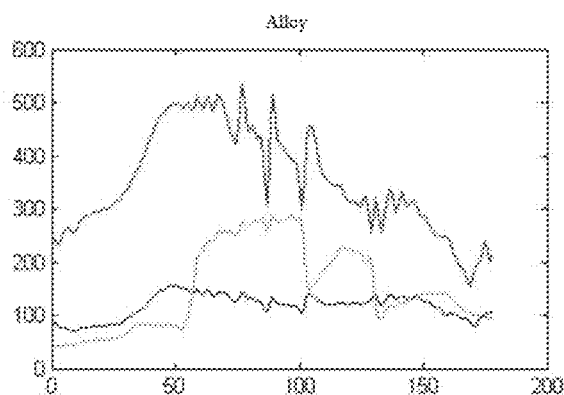
Figure 5D:
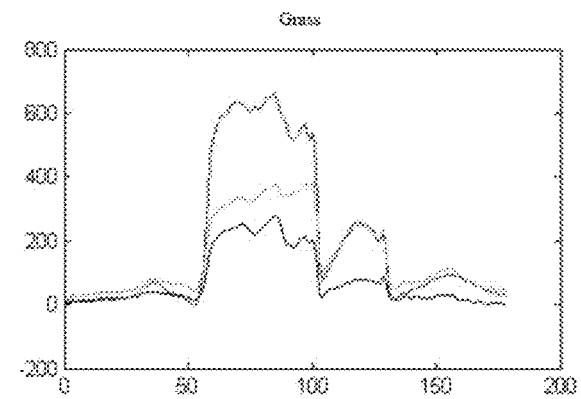
Figure 5E:
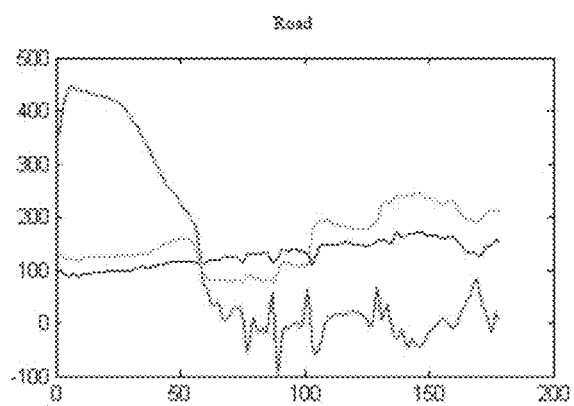
Figure 5F:
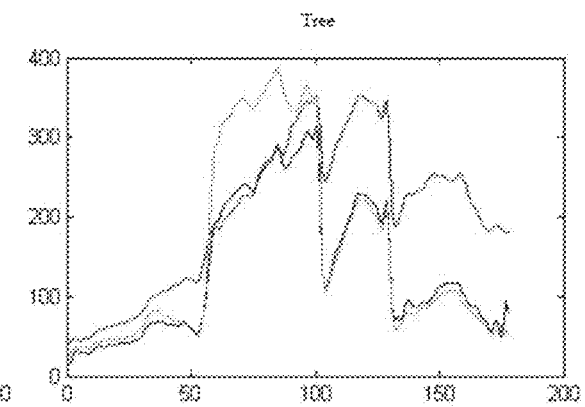

Experimental data HYDICE Urban hyperspectral data contains 210 spectral bands with a dimension of 307×307. The image data contains six substances: road, soil, tree, grass, roof and metal. In the experiment, 178 bands are left in the data after the bands affected by water absorption are removed. A pseudo color image of the part of image is shown in FIG. 4a.

The test results are shown in FIGS. 3a-3e (Washington D.C. mall data) and FIGS. 5a-5f (HYDICE Urban data). It can be seen from the comparison results of the end-member spectrograms that the end-member curves extracted by the end-member extraction method based on segmented VCA are very close to the theoretical spectral curve of the end-members.

In order to further obtain the numerical comparison of accuracy of the end-members extracted by different end-member extraction methods, the accuracy of the extracted end-members is measured using spectral angle distances (SAD) of end-member spectra obtained by different end-member extraction methods and theoretical end-member spectra. The formula for the spectral angle distance is defined as $$SAD = \arccos\left(\frac{A_{unmix,i}^T A_{theo,i}}{\|A_{unmix,i}\| \|A_{theo,i}\|}\right).$$

$A_{theo}$ is a theoretical value of an end-member, and $A_{unmix}$ is an end-member spectral information value extracted by different end-member extraction methods. The shorter the spectral angle distance is, the closer two spectral vectors are. The spectral angle distance comparison results are shown in Table 1 and Table 2. It can be clearly seen that the accuracy of the end-members extracted by segmented VCA is greatly improved for Washington D.C. mall data having relatively simple spatial distribution of ground features and HYDICE Urban data having relatively complex spatial distribution.

Table 1 is a comparison table (Washington D.C. mall data) of spectral angle distances of end-members extracted by segmented VCA, end-members extracted by original VCA and theoretical end-members. Table 2 is a comparison table (HYDICE Urban data) of spectral angle distances of end-members extracted by segmented VCA, end-members extracted by original VCA and theoretical end-members.

TABLE 1

SAD comparison table of end-members extracted by segmented VCA and VCA and theoretical end-members

| SAD | Water | Road | Grass | Roof | Tree | Mean |
| --- | --- | --- | --- | --- | --- | --- |
| Original VCA | 0.58180 | 0.17582 | 0.21371 | 0.08858 | 0.74156 | 0.360294 |
| Segmented VCA | 0.30364 | 0.11693 | 0.20546 | 0.08059 | 0.18585 | 0.178497 |

TABLE 2

SAD comparison table of end-members extracted by segmented VCA and VCA and theoretical end-members

| SAD | Soil | Road | Tree | Grass | Roof | Alloy | Mean |
|---|---|---|---|---|---|---|---|
| Original VCA | 0.14804 | 1.12343 | 0.32690 | 0.10448 | 0.17928 | 0.17943 | 0.34359 |
| Segmented VCA | 0.06507 | 0.22934 | 0.17016 | 0.28003 | 0.22107 | 0.36128 | 0.22116 |

In the present invention, the hyperspectral image of the complex environment is partitioned into a plurality of relatively simple images by using a classification method, and the end-members are extracted from blocks, thereby excluding the influence of unrelated pixels to some extent, reducing the complexity of the end-member extraction environment, reducing the influence of noise of the global image on the algorithm, and avoiding missing main end-members. Specific examples show that the present invention greatly improves the accuracy of extracting end-members.

Although the specific embodiments of the present invention are described above in combination with the accompanying drawings, the protection scope of the present invention is not limited thereto. It should be understood by those skilled in the art that various modifications or variations could be made by those skilled in the art based on the technical solution of the present invention without any creative effort, and these modifications or variations shall be encompassed within the protection scope of the present invention.

The invention claimed is:

1. An end-member extraction method based on segmented vertex component analysis (VCA), comprising:
performing rough segmentation on hyperspectral high-dimensional image data based on an unsupervised classification method to partition image elements having a similar substance into an identical block;
performing end-member extraction on an area in each partitioned block based on VCA;
inverting an abundance based on a least square method after the end-member extraction, the abundance being a predetermined ratio of spectral characteristics of end-members of the high-dimensional image data at different wavelength bands;
determining one main end-member for each block according to the abundance value;
extracting the main end-members in all blocks; and
forming an end-member matrix of a global image.

2. The end-member extraction method based on segmented VCA according to claim 1, wherein principle component analysis (PCA) is performed on the hyperspectral image data for dimensional reduction before performing the rough segmentation on the hyperspectral image based on the unsupervised classification method.

3. The end-member extraction method based on segmented VCA according to claim 2, wherein
the PCA includes:
vector-centering the high-dimensional image data $X=(x_1, x_2, \ldots, x_m)^T$, where x is a pixel of the high-dimensional image data, m is the number of bands of a hyperspectral image and T is the number of images in the high-dimensional image data,
calculating a covariance matrix of the vector-centered high-dimensional image data, and
calculating an eigenvalue matrix $\Lambda$ and an eigenvector matrix A of the covariance matrix;
applying the eigenvector matrix A on the high-dimensional image data X into $Z=A^TX$; and
selecting part of the principal components in Z as low-dimensional features of the original high-dimensional data for data dimensional reduction.

4. The end-member extraction method based on segmented VCA according to claim 3, further comprising:
applying a unsupervised classification process to the hyperspectral image data after dimensional reduction based on an iterative self-organizing data analysis method (ISODATA), wherein:
the number of classes (l) is equal to the number of end-members (r) in a known image such that l=r, and
a segmentation result ($\Gamma$) is:
$\Gamma_i$, where i=1, 2, ..., r.

5. The end-member extraction method based on segmented VCA according to claim 4, further comprising:
automatically merging and splitting the classes in the unsupervised classification process, wherein:
a merging mechanism in the unsupervised classification process is configured such that: (i) when the total number of classes is too large or the center distance between two classes is smaller than a threshold, the two classes are merged into a new class, and (ii) when the number of samples in the class is smaller than a threshold, the merging is cancelled; and
a splitting mechanism in the unsupervised classification process is configured such that when the total number of classes is too small or the number of samples in a class exceeds a threshold, and when the standard deviation within the class is greater than a splitting threshold, the class is divided into two classes, thereby providing a clustering result.

6. The end-member extraction method based on segmented VCA according to claim 4, wherein
for all block areas $\Gamma_i$, the number of end-members is set to r', where r'<r, and VCA end-member extraction is conducted respectively, where r is the number of end-members and r' is the number of end-members after VCA end-member extraction; and
the end-member extraction based on VCA includes:
determining an initial unit vector,
projecting all pixels onto the vector,
marking the pixel with the largest projection distance as an end-member point,
adding the end-member point to an end-member matrix set,
determining a vector orthogonal to all the end-members according to the end-member set, and
performing a new cycle to calculate the pixel projection distance and find new end-members in the hyperspectral image data.

7. The end-member extraction method based on segmented VCA according to claim 4, further comprising:
for all block areas $\Gamma_i$, after the end-members in the blocks are extracted, inverting the abundance for the block areas respectively based on the least square method;

based on the abundance in the block areas, determining the main end-member in each block area; and extracting the main end-members in all blocks to form an end-member matrix of the global image.

8. The end-member extraction method based on segmented VCA according to claim 3, wherein in a linear model:

the pixels x of the high-dimensional image data X are a linear combination of an end-member matrix E and an abundance matrix A that satisfy a formula X=E× A, and the abundance matrix elements $a_{ij}$ satisfy the constraints of a sum $$\sum_{j=1}^{m} a_{ij} = 1,$$

∇i and non-negative $a_{ij} \geq 0$, ∇i, ∇j; and the least square method is an unconstrained least square method (UCLS), where:

the sum of abundances and the non-negative constraint are not considered, and after r end-members $\{e_j\}$ are solved, j=1, 2 ..., r, the linear mixed model is solved using the least square method, and the abundance estimate $(a_{UCLS})$ obtained of pixels i is $a_{UCLS}(x_i) = (E^T E)^{-1} E^T x_i$.

* * * * *